J. H. SEIBERLING.
PNEUMATIC TIRE AND PROCESS OF MAKING THE SAME.
APPLICATION FILED MAY 8, 1915.
1,190,474.
Patented July 11, 1916.
2 SHEETS—SHEET 2.
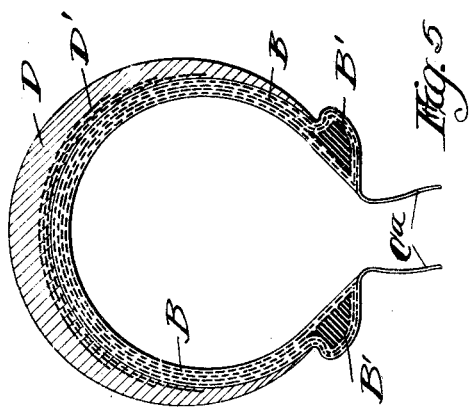
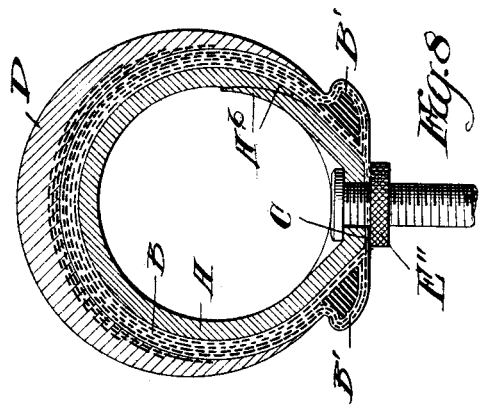
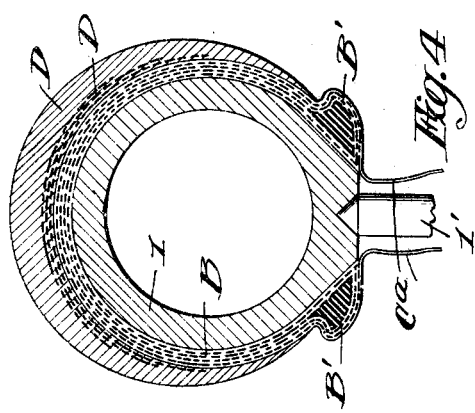
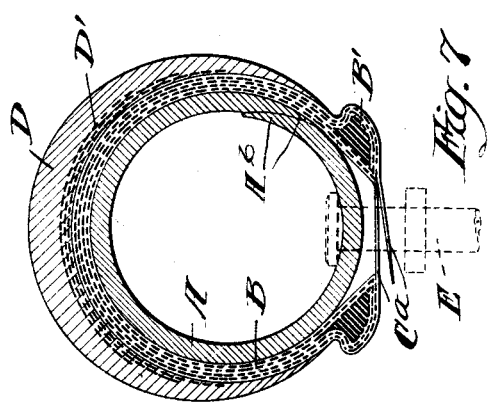
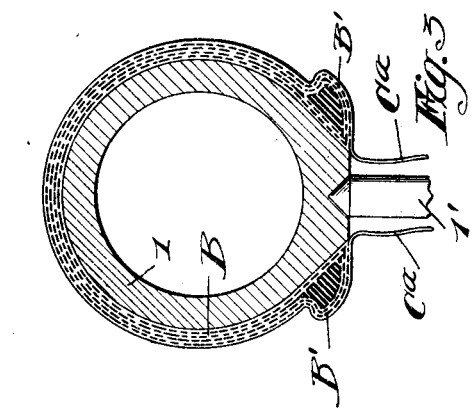
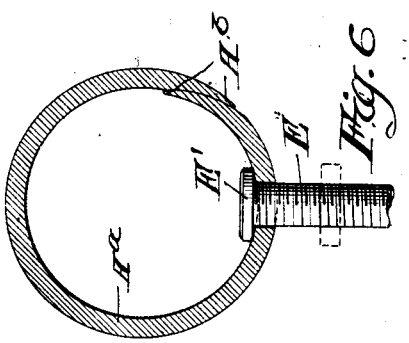
Inventor:
James H. Seiberling

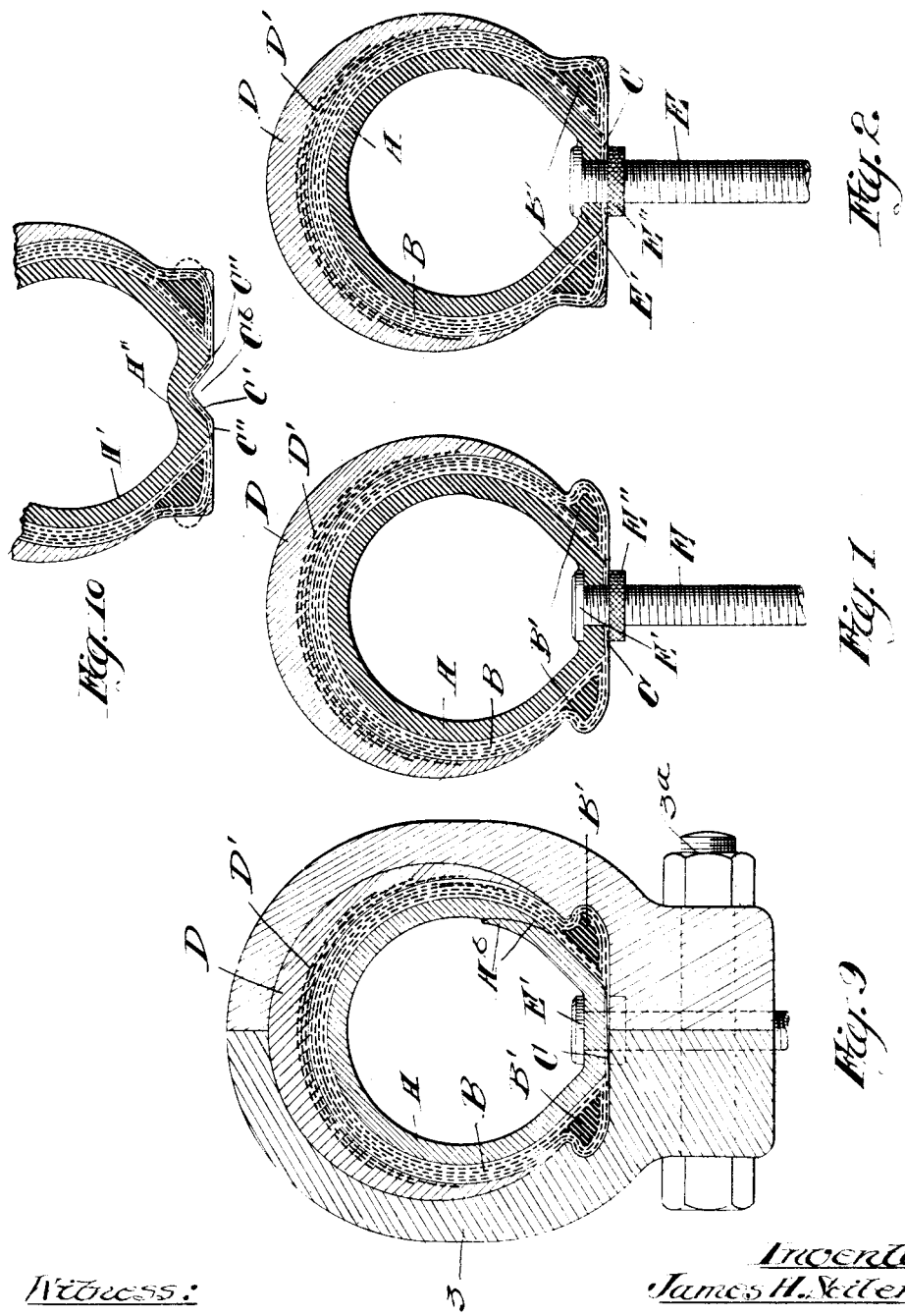

UNITED STATES PATENT OFFICE.

JAMES H. SEIBERLING, OF JONESBORO, INDIANA.

PNEUMATIC TIRE AND PROCESS OF MAKING THE SAME.

1,190,474.     Specification of Letters Patent.     Patented July 11, 1916.

Application filed May 8, 1915. Serial No. 26,779.

*To all whom it may concern:*

Be it known that I, JAMES H. SEIBERLING, a citizen of the United States, and a resident of Jonesboro, Grant county, Indiana, have invented a certain new, useful, and Improved Pneumatic Tire and Process of Making the Same, of which the following is a specification.

My invention relates primarily to improvements in the art of making pneumatic tires for motor vehicles, and secondarily to improvements in the form and construction of such tires.

The object of my invention is to reduce the number and the expense of the steps or acts required for the production of finished pneumatic tires, and to provide single piece tires that shall be adapted to take the place of the two-part pneumatic tires now in general use, and which shall be capable of rendering protracted service, with less care and at less cost to the user.

Other and special objects of my invention and the many advantages thereof, clearly appear hereinafter.

My invention resides in steps whereby, preferably, the complete tire structure is built up in a green state and is finished in one vulcanizing operation; and the invention incidentally includes the product of such process; all as hereinafter described and particularly pointed out in the appended claims.

The invention will be more readily understood by reference to the accompanying drawings forming a part of this specification and in which:—

Figure 1 is a cross sectional view of a completed pneumatic tire of clencher form produced by and embodying my invention. Fig. 2 is a like section, showing the tire in its straight-side form. Figs. 3 to 9 inclusive are cross sectional views illustrating the several steps in the construction of the tire; Figs. 3 and 4 showing the core upon which the carcass and tread are formed, and Fig. 9 disclosing the mold in which the tire is vulcanized. Fig. 10 illustrates a modification of my invention in which I employ the coupler portion as a means for distending or widening the base of the tire when inflated. Said radial cross sections are so well understood by those skilled in the art, that I have deemed it unnecessary to show the complete annular tire.

My novel tire, in the completed state shown in Figs. 1 and 2, comprises the following parts, to-wit: the closed lining, A;— the open carcass, B, including the separated base portions or beads, B', B';— the flexible base coupling, C,;— and the carcass covering or tread portion, D, containing the strips, D'. The carcass, B, including the coupler flaps, C, is chiefly composed of cotton, or other strong fabric, impregnated with rubber; and the strips, D', are of the same or similar fabric. All other portions are composed of rubber. By rubber I mean the natural and artificial compositions commonly used in pneumatic tires. All these parts are integrally united by vulcanization and therefore constitute a single piece pneumatic tire, shaped to fit the flanged rim of a motor vehicle wheel. The valve stem, E, is positioned between the base portions, B', and is permanently and tightly secured by the vulcanization of the parts. No separate inner air tube is required, for in this tire the rubber lining, C, takes the place of the usual inner tube. As shown by Figs. 1 and 2, the base beads of the tire may be of clencher form or of straight-side form. Both views present base beads that are united by the couplers or flaps, C, above mentioned. The inner lining is preferably comparatively thick to overcome minor forces tending to puncture it, but it should be understood that its chief office is to make airtight the carcass or casing proper, which is closed by the base couplers, C. The carcass of the tire is protected from puncture by the covering or thick tread portion, D, with its strips, D'. As the carcass, the lining and the covering are all one, the tire is in large measure self-healing in case of puncture. The parts cannot separate and hence the difficulty commonly presented by the lodgment of sharp particles between the carcass and lining is entirely obviated. In event repair of the interior of the tire becomes necessary I find it very easy to open or cut the flexible coupler portion, then repair the injured part and afterward patch and revulcanize the flexible couplers. My tire compared with others of the same wall-thickness may be made with less material and in manufacture involves less waste than others, and as hereinafter explained it is made by a simpler and less expensive process. Its low cost coupled with its obvious advantages in use make it a very acceptable substitute for the two-piece tires of common type. My tire possesses the further advantage that it may be carried as a spare tire, in a partially inflated condition. That gives assurance of its soundness and goes toward its better preservation. In the matter of placing the tire upon fixed-flanged rims, my tires work like others, for the couplers, C, which prevent undue distention of the base portions, do not prevent the closing together of those portions, to enter the beads between the rim flanges.

In Fig. 10 I have illustrated a modification of my invention in which the coupler portion, C¹, instead of extending straight across from one edge or base portion to the other, is crimped or bent outwardly; that is, toward the center of the tire section. By so forming the base of the tire I make it more easily compressible in a lateral direction when not inflated, and provide a device which distends or thrusts the opposed base beads outward when the tire is inflated. This crimp or bend, appearing in the cross section of the tire, is in reality a circumferential fold which forms a V-shaped groove, C^b, in the inner periphery of the tire, and interrupted only at the valve-stem point. This formation is secured by an appropriate and obvious modification of the mold shown in Fig. 9. It will be observed that the opposed coupler flaps, constituting the coupler C¹, extend toward one another for a short distance virtually in the planes of respective base beads or edges, forming the flaps C'', and are thence bent outwardly or upwardly to provide the described partial fold or crimp. In this manner sharp turns are avoided at the relatively rigid toe-points of the base beads, affording desirable durability. The lining A¹ is applied over the coupler before described but, preferably, substantially conforms to the change outline of the coupler portion, thus providing the raised internal ridge A''. Such a tire base may be compressed in a lateral or transverse direction at times when the tire is not inflated, whereas, upon the inflation of the tire, the bent or crimped coupler acts after the manner of a toggle lever between the opposed base portions, and thrusts them upwardly, thereby markedly increasing the friction and grip of the tire upon the flanges of the containing wheel rim. As indicated by dotted lines in Fig. 10, the tire base beads may be of either clencher or straight-side form, as desired.

The novel process, of which the above described tire is the product, requires very few tools or implements. For this purpose, I preferably provide a carcass core, 1, (see Figs. 3 and 4); a vulcanizing mold, 3 (see Fig. 9) and suitable hand tools such as are common in the tire maker's art.

As indicated in Fig. 3, the metal carcass core, 1, is of a form determined by the shape of the tire to be made. It is centered and supported by the usual spider, 1', being an arm or spoke of such a spider.

The first step of my process consists in forming the carcass, B, upon the core, 1. This is done by stretching, forming and stitching successive layers of fabric thereon, and concurrently forming the two opposed and separate terminal beads, B', of the carcass, which terminals are commonly called base beads or base portions. All this is done in the usual manner; except that before placing the outer layer of fabric upon the base portions, B', I shear and shape the edges of the underlying layers. The piece of fabric forming the outer layer is of such width that after it is applied its edges hang freely from the inner toes of the base beads, B', forming flaps or flanges, C^a, each of sufficient width to bridge the gap between said base portions, B', B', as required for the later formation of the base coupler, C. After completing the carcass in the manner described, I next apply the covering or tread portion, D, in the usual manner, as shown in Fig. 4. Thereafter I strip the carcass from the core. It then presents the appearance shown in Fig. 5. As a concurrent or next step, I form a sheet, A^a, of raw or green rubber into an endless tube, by uniting its ends, and lapping and pressing its edges, A^b, upon one another as shown in Fig. 6. After perforating the endless tube at one point, I insert in the perforation the head, E', of the metal valve stem, E. Having prepared the carcass, B, as shown in Fig. 5, and having made ready the lining, A, as shown in Fig. 6, I place the latter within the carcass B, as shown in Fig. 7, springing the base portions apart to receive the tube. I then seal the tubular lining, A, within the carcass by lapping and closing the flaps, C^a, one upon the other, as indicated in Fig. 7. The lapping of the flaps at the valve stem point is allowed by perforating both flaps, C^a, at that point, to receive the valve stem, E. The nut and washer, E'', of the valve stem is then screwed home upon the stem and acts against the coupler portion, C, to draw the lower part of the lining, A, into contact therewith adjacent the valve stem. This operation is clearly shown in Fig. 8. Having reached this stage the green structure or tire is then ready to be vulcanized. To such end I inclose the same in a parted mold, 3, without change in the position of the valve stem. The mold is formed to receive and make a tight joint with the tire at the temporary juncture of the mold, tire and valve stem. The cavity of the mold is preferably slightly larger than the green tire for two chief reasons: First, to allow the easy placing of the tire in the mold and, second, to allow slight distention of the tire within the mold, as hereinafter explained. The parts of the mold are clamped together by means of bolts, 3a. After thus placing the green tire in the mold, I first inject a small quantity of water through the valve stem, E, and then fully inflate the tire with air also through the valve stem, E. Thereupon I place the mold and contained tire in a suitable vulcanizer and heat the same to a temperature and for a length of time determined by the experience of the operator and the service for which the tire is intended. The water within the tire expands as steam and the combined pressure of air and steam effectually distends the tire within the mold and thus gives the tire the uniform dimensions of the mold and eliminates all inequalities and wrinkles in the fabric of the tire. The process or method of manufacturing the tire is not materially modified in dealing with the form depicted in Fig. 10, and therefore need not be described in its special application thereto.

It will be observed that in my process I preferably do not subject the carcass and tread to even partial vulcanization before finally vulcanizing the tire as a whole in the described mold. Nevertheless, I wish it understood that the interpolation of such a step would not modify or exceed the scope of my invention. Upon the removal of the vulcanized tire from the mold it presents the appearance depicted in Fig. 1, or if the mold be of the straight side character, the appearance presented in Fig. 2. To those skilled in the art it will at once be apparent that in my process I produce the completed ready-to-use tire by few and very simple operations and wholly avoid the necessity for special treatment of the inner walls of the carcass and the need for a separate and delicate inner tube.

As indicated above, various modifications of my invention will readily suggest themselves to one skilled in the art, and therefore I do not limit my invention to the details of the foregoing description.

Having thus described my invention, I claim as new and desire to secure by Letters Patent:—

1. The herein described improved pneumatic tire, comprising in combination, a carcass composed of layers of carcass fabric, the edges of which layers are augmented by other material and formed into separate, and separated, thickened base beads having circumferential inner toes, the edges of one of said layers being extended inwardly beyond respective toes and being lapped one upon the other and forming a flexible, but substantially inextensible, coupling between said separated base beads, an inflatable air tight lining within the annular chamber formed by said carcass and coupling, and a covering or tread on said carcass, the whole constituting a unitary vulcanized structure.

2. The herein described improved pneumatic tire, comprising in combination, a carcass composed of layers of carcass fabric, the edges of which layers are augmented by other material and formed into separate, and widely separated, thickened base beads having circumferential inner toes, the edges of one of said layers being extended inwardly beyond respective toes and being lapped one upon the other and forming a flexible, but substantially inextensible, coupling between said separated base beads, an outwardly extending circumferential bead being formed in said coupling and being of less width, leaving straight juncture portions C" at the edges of said toes, an inflatable air tight lining within the annular chamber formed by said carcass and coupling, and a covering or tread on said carcass, the whole constituting a unitary vulcanized structure.

In testimony whereof, I have hereunto set my hand this 6th day of May, 1915, in the presence of two subscribing witnesses.

JAMES H. SEIBERLING.

Witnesses:
W. R. MEEK,
DE WITT CARTER.